(12) United States Patent
Nakamura

(10) Patent No.: US 8,982,392 B2
(45) Date of Patent: Mar. 17, 2015

(54) DEVICE SEARCH SYSTEM, DEVICE SEARCH METHOD, IMAGE FORMING APPARATUS, AND INFORMATION PROCESSING APPARATUS

(71) Applicant: Canon Kabushiki Kaisha, Tokyo (JP)

(72) Inventor: Tadahiro Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/936,619

(22) Filed: Jul. 8, 2013

(65) Prior Publication Data

US 2014/0036305 A1    Feb. 6, 2014

(30) Foreign Application Priority Data

Aug. 6, 2012   (JP) .................... 2012-174367

(51) Int. Cl.
| | |
|---|---|
| G06F 3/12 | (2006.01) |
| H04N 1/00 | (2006.01) |
| G06F 3/14 | (2006.01) |
| G06K 15/00 | (2006.01) |

(52) U.S. Cl.
CPC ............. H04N 1/00281 (2013.01); G06F 3/14 (2013.01); H04N 1/00222 (2013.01); *H04N 2201/0044* (2013.01); *H04N 2201/0072* (2013.01); *H04N 2201/0094* (2013.01)

USPC .......................................... 358/1.15; 358/1.18

(58) Field of Classification Search
CPC ....... G06F 8/61; G06F 3/1204; G06F 3/1206; G06F 3/1253
USPC ...................... 358/1.13, 1.14, 1.15, 1.18, 402; 709/220, 222, 223, 224; 399/79, 83
See application file for complete search history.

(56) References Cited

U.S. PATENT DOCUMENTS

| | | | | |
|---|---|---|---|---|
| 2006/0221863 | A1* | 10/2006 | Ishimoto et al. | 370/254 |
| 2009/0221863 | A1* | 9/2009 | Strauss et al. | 585/710 |
| 2012/0200878 | A1* | 8/2012 | Sasaki | 358/1.13 |

FOREIGN PATENT DOCUMENTS

| | | |
|---|---|---|
| JP | 2002-189645 A | 7/2002 |
| JP | 2005-141620 A | 6/2005 |

* cited by examiner

*Primary Examiner* — Gabriel Garcia
(74) *Attorney, Agent, or Firm* — Fitzpatrick, Cella, Harper & Scinto

(57) ABSTRACT

When a plurality of image forming apparatuses are found on a network, it is difficult to identify an image forming apparatus to be used by the user from the plurality of found image forming apparatuses. When the user presses a button on an image forming apparatus, a name of the image forming apparatus included in a search response is changed for a predetermined time period, and the changed name is displayed as a search result.

11 Claims, 22 Drawing Sheets

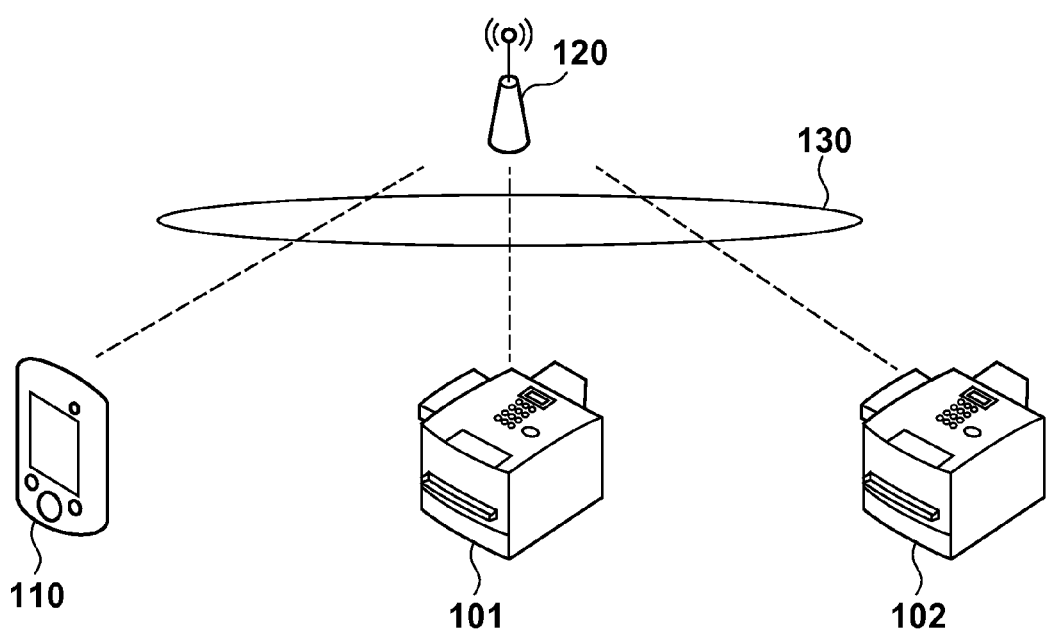
F I G. 1

F I G. 2
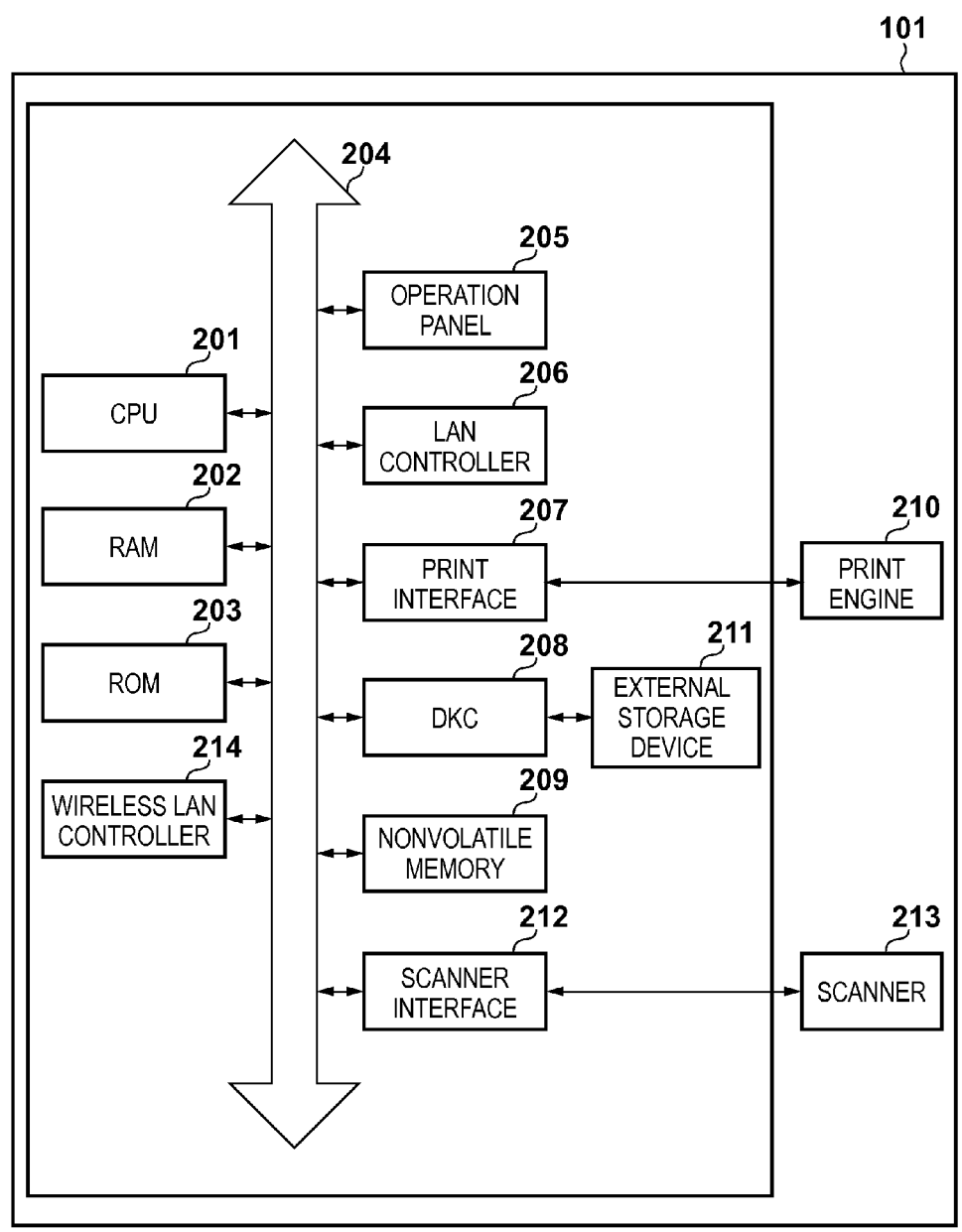

F I G. 3
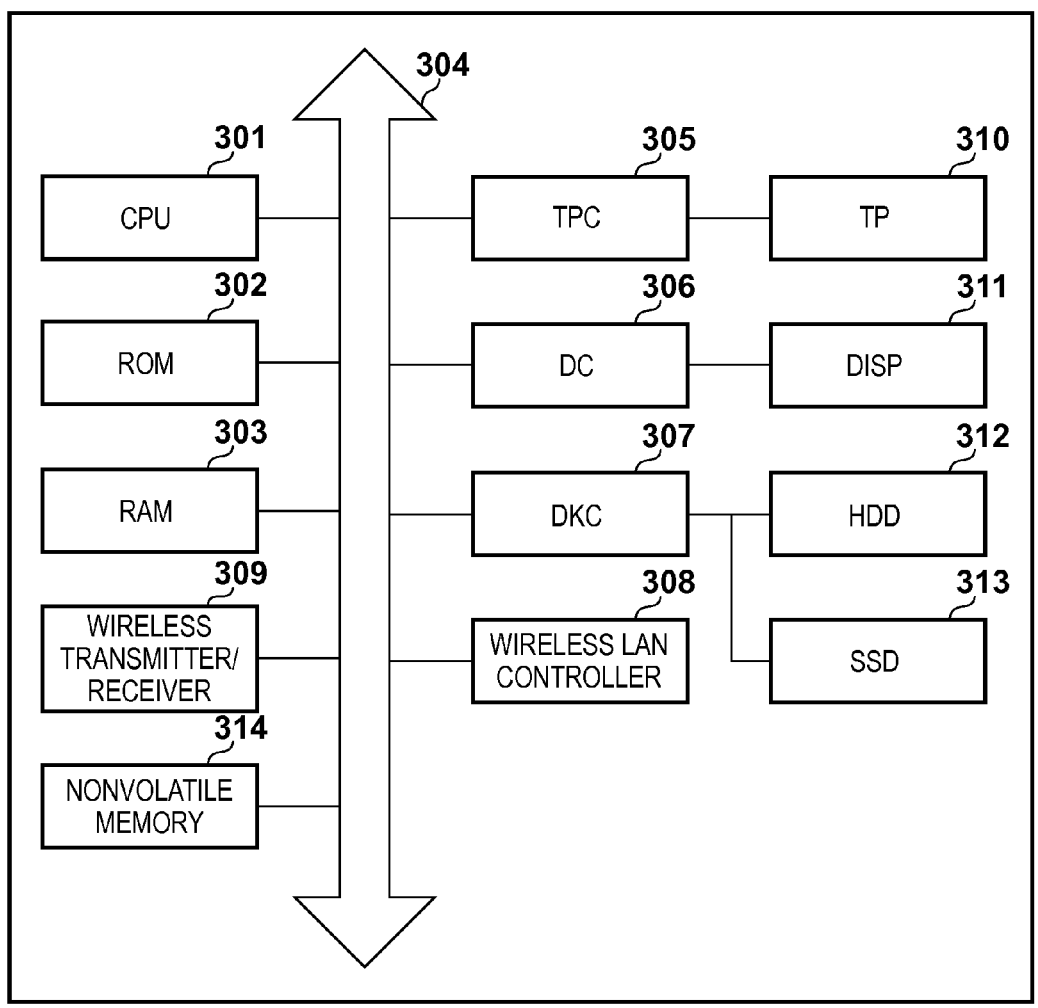

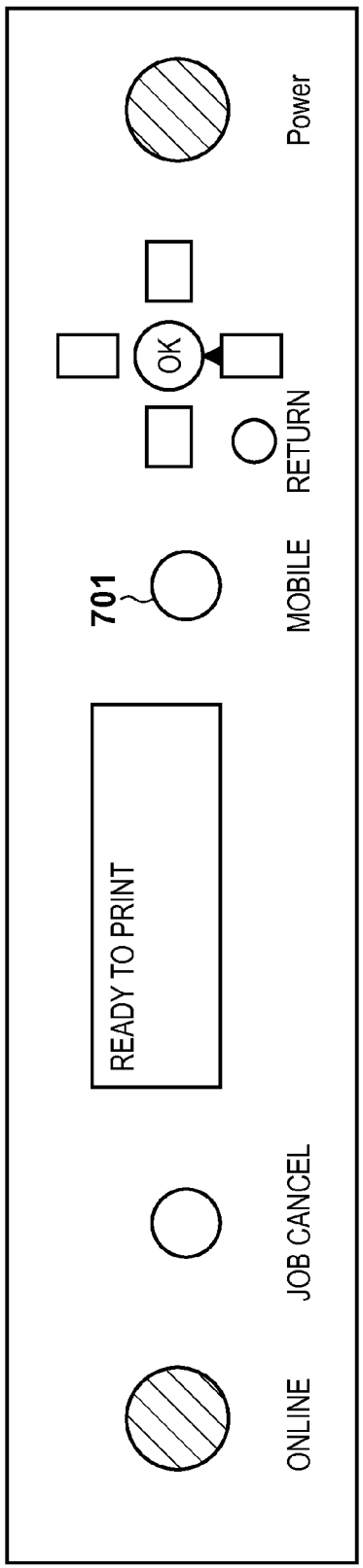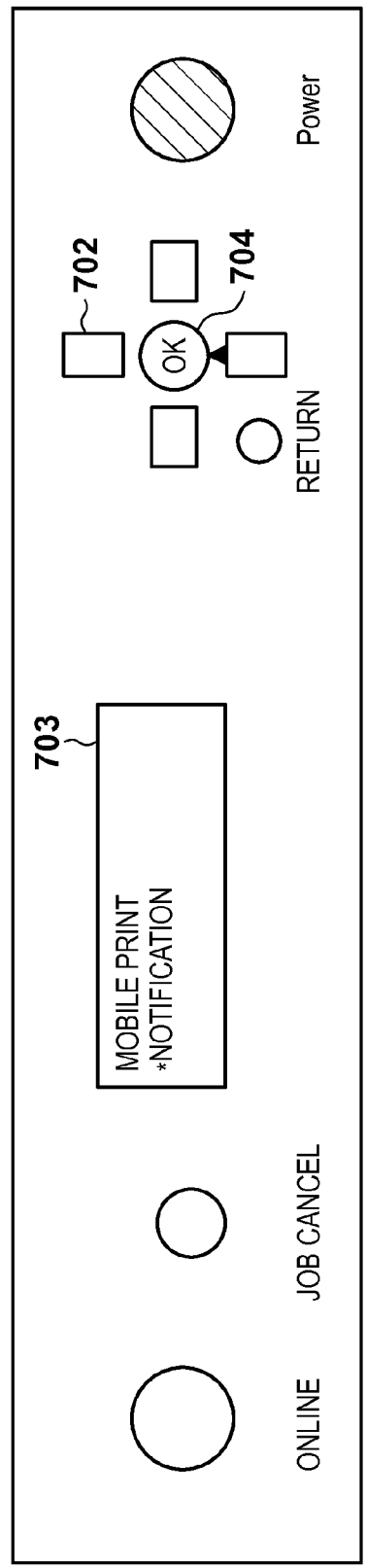

FIG. 10

| DEVICE IDENTIFIER | DEVICE NAME | USE COUNT | LAST USE TIME | FAVORITE |
|---|---|---|---|---|
| 1001 | ★Printer1 | 10 | 2012/5/1 10:00 | Y |
| 1002 | Printer2 | 5 | 2012/5/1 12:00 | N |
| 1003 | Printer3 | 1 | 2012/5/1 13:00 | N |

F I G. 11
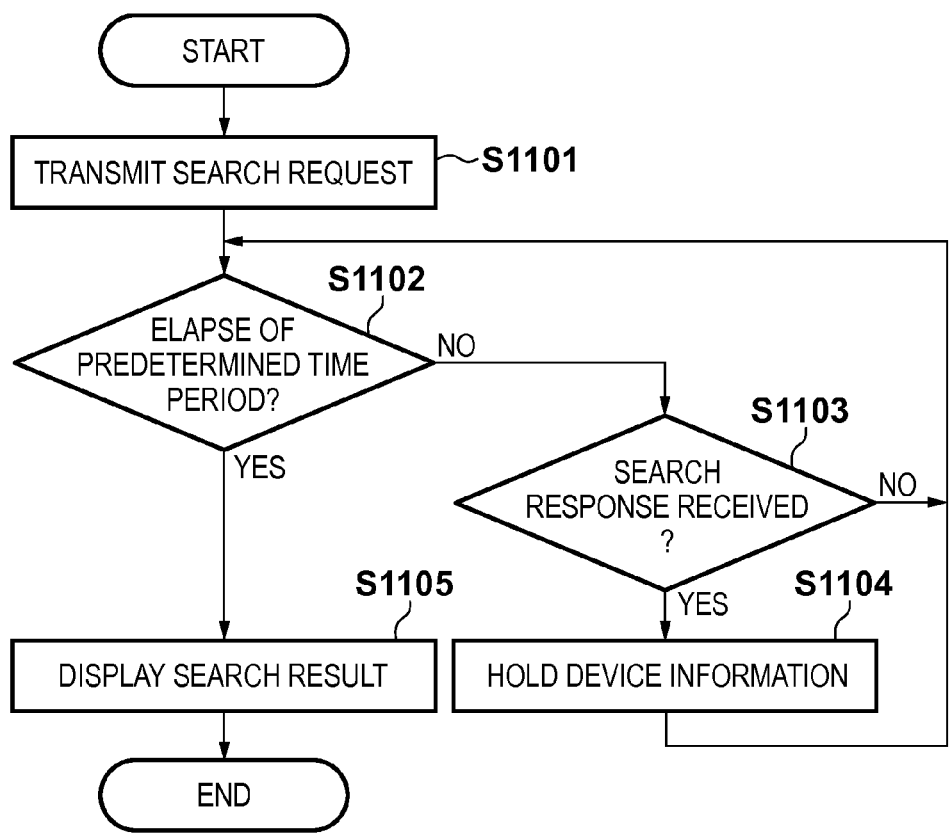
F I G. 12
```
query/response :    query
name :              _ipp._tcp.local
type :              Domain Name Pointer
```

FIG. 13A

1301 {
```
query/response :    response
name :              _ipp._tcp.local
type :              Domain Name Pointer additional record
name :              Printer1
type :              TEXT
id :                1001

IP address :        192.168.0.1
type :              Host Address
```

FIG. 13B

```
query/response :    response
name :              _ipp._tcp.local
type :              Domain Name Pointer additional record
name :              ★Printer1
type :              TEXT
id :                1001

IP address :        192.168.0.1
type :              Host Address
```

| DEVICE IDENTIFIER | DEVICE NAME | IP ADDRESS |
|---|---|---|
| 1001 | Printer1 | 192.168.0.1 |

F I G. 16
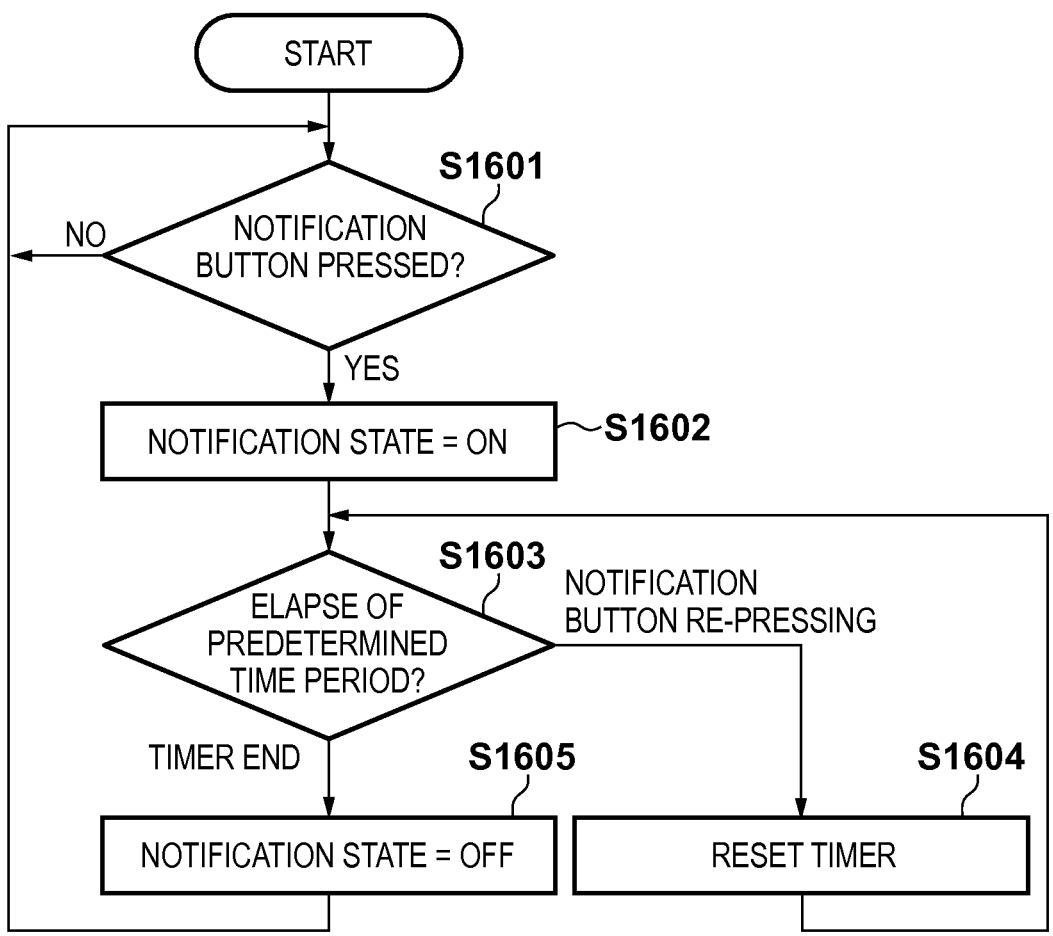

FIG. 19

| | | |
|---|---|---|
| | query/response : | response |
| | name : | _ipp._tcp.local |
| | type : | Domain Name Pointer |
| | | |
| | additional record | |
| | name : | Printer1 |
| | type : | TEXT |
| | id : | 1001 |
| 1901 | button_pressed : | true |
| 1902 | button_time : | 2012/5/1 12:00 |
| 1903 | button_user : | user1 |
| 1904 | button_num : | 10 |
| 1905 | button_totalnum : | 100 |
| | | |
| | IP address : | 192.168.0.1 |
| | type : | Host Address |

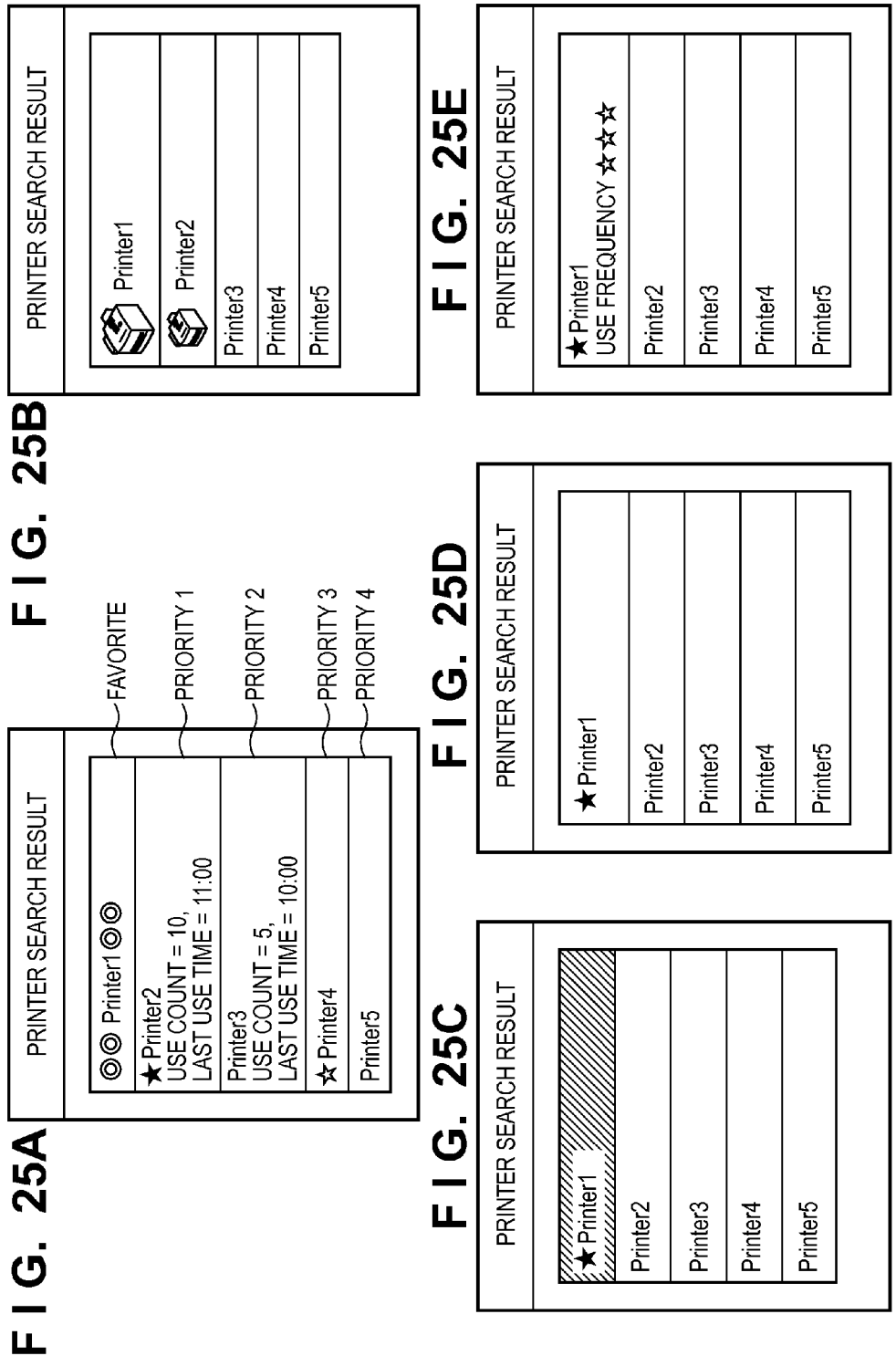

DEVICE SEARCH SYSTEM, DEVICE SEARCH METHOD, IMAGE FORMING APPARATUS, AND INFORMATION PROCESSING APPARATUS

BACKGROUND OF THE INVENTION

1. Field of the Invention

The present invention relates to a technique for searching for a device on a network in a mobile environment and, more particularly, to a device search system, device search method, image forming apparatus, and information processing apparatus.

2. Description of the Related Art

Conventionally, it is possible to search for a device such as a printer connected on a network from a mobile terminal such as a smartphone or tablet, to display the found device on the mobile terminal as a client, and to allow the user to use that device. In this case, a technique such as Bonjour or WS-Discovery is used as a device search protocol. Such technique uses multicast transmissions. A requesting client distributes a search request onto a network by a multicast transmission, and a device which receives the search request returns a response, thus allowing the user to find the device on the network.

On the other hand, when a plurality of devices is found, it is difficult for the user to identify a device that he or she wants to use. That is, it is difficult to associate displayed devices and existing devices. Model names or the like of devices are displayed as search results, and such information is not sufficient for the user to identify a desired device.

Hence, Japanese Patent Laid-Open No. 2002-189645 discloses a technique for displaying device search results in ascending order of distance from a mobile terminal while the mobile terminal and respective device have a GPS (Global Positioning System) function. With this technique, when the user who holds the mobile terminal conducts a device search in the vicinity of a desired device, that device is display as an uppermost search result, and the user can easily identify the device.

Japanese Patent Laid-Open No. 2005-141620 discloses a technique for displaying, as search results, photos or movies of locations where devices are actually placed together with the found devices. This technique allows the user to easily identify a desired device from the search results.

However, even when the aforementioned techniques are used, it is still difficult for the user to identify a device that he or she wants to use when a plurality of devices are found.

The technique of Japanese Patent Laid-Open No. 2002-189645 uses the GPS function. In an environment in which a plurality of devices are installed within a narrow space region, for example, in an environment in which devices are arranged at adjacent positions or on upper and lower floors, it is difficult to identify devices in terms of the precision of the GPS function. In order to surely identify a desired device, the user has to conduct a device search in the vicinity of the desired device, and this technique becomes less effective when the user wants to use a device at a remote place.

The technique of Japanese Patent Laid-Open No. 2005-141620 has to prepare for photos and movies of installation locations, and requires much labor to always maintain the latest information. Also, this technique requires a rich UI required to display photos and movies as search results, and is not suitable for a mobile terminal having a small UI.

SUMMARY OF THE INVENTION

The present invention has been made to solve the aforementioned problems, and provides a device search system, device search method, image forming apparatus, and information processing apparatus which allow the user to easily identify a desired device even when a plurality of devices are found as device search results.

In order to achieve the above object, the present invention includes the following arrangement.

According to one aspect of the invention, there is provided a device search system in which an information processing apparatus connected to a communication network searches for an image forming apparatus, wherein the image forming apparatus comprises a holding unit configured to hold, when a notification input from a user is received, a notification state indicating the reception of the notification input for a predetermined time period since the reception of the notification input, and the information processing apparatus comprises a display unit configured to display, when a search response to a search request transmitted to the image forming apparatus is received, a name of an image forming apparatus according to the notification state set when the image forming apparatus receives the search request as a search result based on a name of the image forming apparatus included in the search response.

According to another aspect of the present invention, there is provided an image forming apparatus in a device search system in which an information processing apparatus connected to a communication network searches for image forming apparatuses, and displays a list of responding image forming apparatuses, the apparatus comprising: a holding unit configured to hold, when a notification input from a user is received, a notification state indicating the reception of the notification input for a predetermined time period since the reception of the notification input; and a search request processing unit configured to transmit a search response including an identifier of the image forming apparatus and a name of the image forming apparatus depending on whether or not the notification state is set in response to reception of a search request from the information processing apparatus.

According to still another aspect of the present invention, there is provided an image forming apparatus in a device search system in which an information processing apparatus connected to a communication network searches for image forming apparatuses, and displays a list of responding image forming apparatuses, the apparatus comprising: a holding unit configured to hold, when a notification input from a user is received, a notification state indicating the reception of the notification input for a predetermined time period since the reception of the notification input; and a search request processing unit configured to transmit a search response including an identifier and a name of the image forming apparatus and a notification attribute indicating notification state in response to reception of a search request from the information processing apparatus.

According to yet another aspect of the present invention, there is provided an information processing apparatus in a device search system in which an information processing apparatus connected to a communication network searches for an image forming apparatus that holds, when a notification input from a user is received, a notification state indicating the reception of the notification input for a predetermined time period since the reception of the notification input, the apparatus comprising: a transmission unit configured to transmit a search request to the image forming apparatus; and a display unit configured to display, when a search response is received from the image forming apparatus, a name of the image forming apparatus according to the notification state set when the image forming apparatus receives the search request based on a name of the image forming apparatus included in the search response.

According to still yet another aspect of the present invention, there is provided a method of searching a device in device search system in which an information processing apparatus connected to a communication network searches for an image forming apparatus, the method comprising: holding by the image forming apparatus a notification state indicating the reception of the notification input for a predetermined time period since the reception of the notification input when the image forming apparatus receives a notification input from a user, and displaying by the information processing apparatus a name of an image forming apparatus according to the notification state set when the image forming apparatus receives the search request as a search result based on a name of the image forming apparatus included in the search response when the information processing apparatus receives a search response to a search request transmitted to the image forming apparatus.

According to the present invention, even when a plurality of devices are found as device search results, the user can easily identify a desired device.

Further features of the present invention will become apparent from the following description of exemplary embodiments with reference to the attached drawings.

BRIEF DESCRIPTION OF THE DRAWINGS

FIG. 1 is a block diagram showing an example of the arrangement of a device search system;

FIG. 2 is a block diagram showing the hardware arrangement of an image forming apparatus 101;

FIG. 3 is a block diagram showing the hardware arrangement of a mobile terminal 110;

FIGS. 7A and 7B are views showing screen examples of a notification button using a hardware key on the operation panel of the image forming apparatus 101;

FIG. 10 is a table showing an example of a device setting list managed by a device setting management unit 504;

FIG. 11 is a flowchart showing device search processing of the mobile terminal 110;

FIG. 12 is a view showing an example of a search request to be transmitted by the mobile terminal;

FIGS. 13A and 13B are views showing examples of search responses to be transmitted by the image forming apparatus;

FIG. 14 is a table showing an example of a search result list to be temporarily held at a search conduction timing;

FIG. 16 is a flowchart showing processing of a user input acceptance unit 402;

FIG. 19 is a view showing an example of search response data to be transmitted by an image processing apparatus;

FIGS. 25A, 25B, 25C, 25D, and 25E are views showing display examples of search results displayed on the mobile terminal.

DESCRIPTION OF THE EMBODIMENTS

Figure 4:
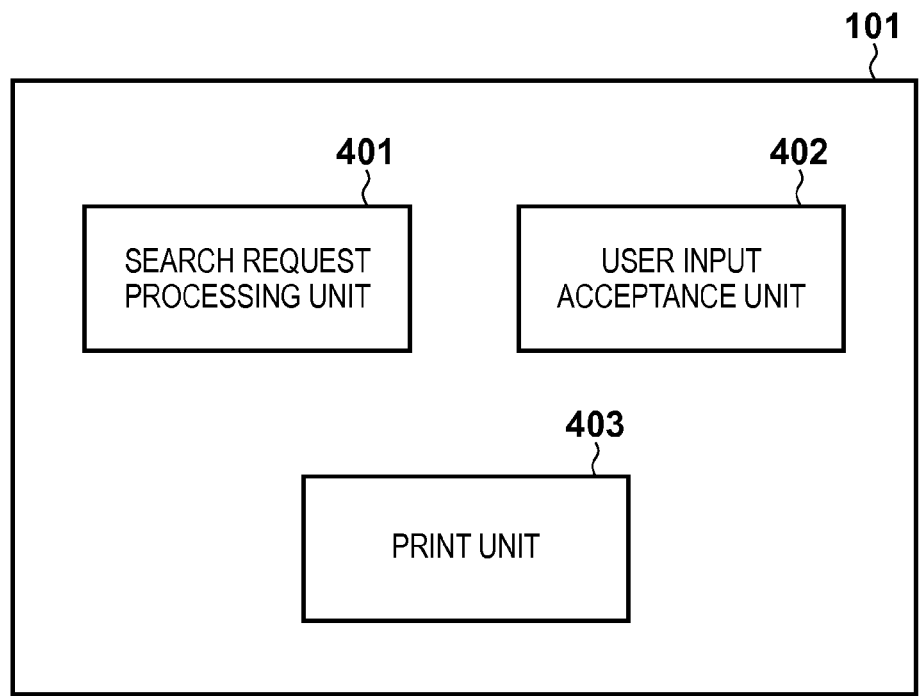
FIG. 4 is block diagram showing the software configuration of the image forming apparatus 101.

This embodiment will explain a case using Bonjour (BONJOUR: registered trademark) as a device search protocol.

<Hardware Arrangement>

FIG. 1 is a block diagram showing an example of the arrangement of a device search system to which this embodiment is applied. Referring to FIG. 1, a mobile terminal 110 as an information processing apparatus and image forming apparatuses 101 and 102 are connected using a communication network 130 via an access point 120, and communicate with each other. Although not shown, more mobile terminals and image forming apparatuses may be connected. The image forming apparatuses and access point may be connected via wired communications in place of wireless communications.

The mobile terminal 110 is, for example, a smartphone, mobile phone, tablet, or notebook type PC, and conducts a device search to find the image forming apparatuses 101 and 102. The user can select a desired image forming apparatus and can make a print operation and the like. In this embodiment, since the image forming apparatuses 101 and 102 do not have any characteristic processing differences, they will be described together hereinafter using reference numeral 101 except for a necessary case.

FIG. 2 is a block diagram showing the hardware arrangement of the image forming apparatus 101. In this case, a copying machine will be exemplified. In the image forming apparatus 101 shown in FIG. 2, a CPU 201 systematically controls accesses to various devices connected to a system bus 204 based on a control program stored in a ROM 203 or external storage device 211. Also, the CPU 201 outputs an image signal as output information to a print unit (printer engine) 210 connected via a print interface 207, and controls an image signal input from a scanning unit (scanner) 213 connected via a scanner interface 212. The CPU 201 can execute communication processing with terminals and image forming apparatuses on a network via a LAN controller 206 or wireless LAN controller 214. A RAM 202 mainly functions as a main memory, work area, and the like of the CPU 201. A disk controller (DKC) 208 controls accesses to the external storage device 211 including a hard disk (HDD), IC card, and the like. The hard disk stores application programs, font data, form data, and the like, and is used as a job storage area required to temporarily spool a print job and to externally control the spooled job. Furthermore, the HDD is also used as a BOX data storage area which holds image data scanned by the scanner 213 and that of a print job as BOX data, and can refer to or print the held data from the network. In this embodiment, the HDD is used as the external storage device, which holds various logs such as job logs and image logs. An operation panel 205 allows the user to input various kinds of information using software or hardware keys. A nonvolatile memory 209 stores various kinds of setting information which are set from the operation panel 205 and from the terminal via the network.

FIG. 3 is a block diagram showing the hardware arrangement of the mobile terminal 110. In this case, a smartphone will be exemplified. Referring to FIG. 3, a CPU 301 controls various devices connected to a system bus 304. A ROM 302 stores a BIOS and boot program. A RAM 303 is used as a main storage device of the CPU 301. A TPC 305 is a touch panel controller, which detects a touch state on a touch panel (TP) 310 and notifies the CPU 301 of that state. A display controller (DC) 306 controls display on a display (DISP) 311. A disk controller (DKC) 307 accesses a hard disk (HDD) 312 and SSD 313. A wireless LAN controller 308 connects a wireless LAN network, and makes information communications via the network. A wireless transmitter/receiver 309 connects a mobile phone network such as 3G or 4G to make information communications. A nonvolatile memory 314 stores various kinds of setting information.

<Software Configuration>

FIG. 4 is a block diagram showing the software configuration of the image forming apparatus 101. Programs of respective processing units in this block diagram are stored in the HDD 211 shown in FIG. 2, are read out onto the RAM 202, and are executed by the CPU 201. When a search request processing unit 401 receives a search request from the mobile terminal 110, it analyzes the search request to generate search response data, and transmits that data as a search response onto the network 130. The search response data to be generated changes depending on request contents designated by the search request, and includes, for example, various kinds of information associated with an image forming apparatus such as a name and IP address of the image forming apparatus. A user input acceptance unit 402 accepts an input of pressing of a notification button, that is, a notification input using the operation panel 205 by the user, and manages a notification state (to be described later). Pressing of the notification button means selection of the corresponding image forming apparatus by the user. The search request processing unit 401 changes search response data to be generated according to the notification state (in other words, a selection state of that image forming apparatus). More specifically, the search request processing unit 401 executes processing for changing a name of an image forming apparatus included in the search response data. A print unit 403 receives a print request from the mobile terminal 110, and executes print processing.

Figure 5:
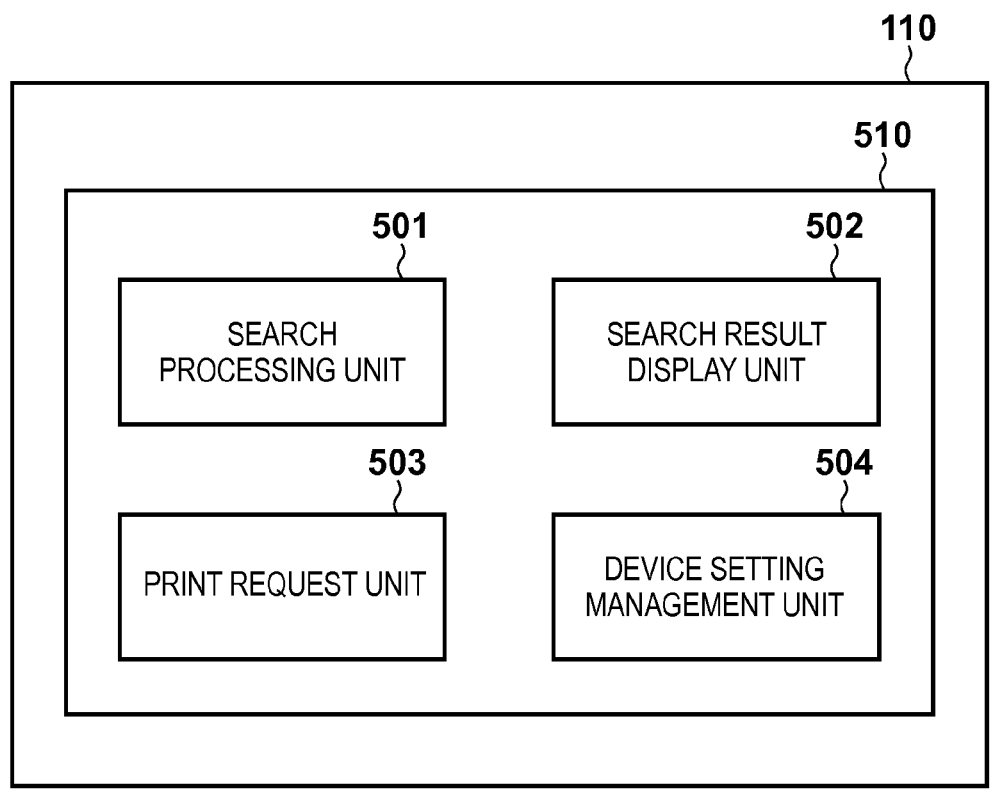
FIG. 5 is block diagram showing the software configuration of the mobile terminal 110.

FIG. 5 is a block diagram showing the software configuration of the mobile terminal 110. Programs of respective processing units in this block diagram are stored in the HDD 312 or SSD 313 shown in FIG. 3, are read out onto the RAM 303, and are executed by the CPU 301. An OS 510 is an operating system including a search processing unit 501, search result display unit 502, print request unit 503, and device setting management unit 504. The search processing unit 501 transmits a search request onto the network 130, and receives search responses from the image forming apparatuses 101 and 102. The search result display unit 502 processes the received search responses, and displays them as search results. The print request unit 503 transmits a print request including print data to an image forming apparatus selected from the search results. The device setting management unit 504 manages various print settings, and stores information of a favorite image forming apparatus and an image forming apparatus which performed print processing.

<Example of Operation Panel>

Figure 6A:
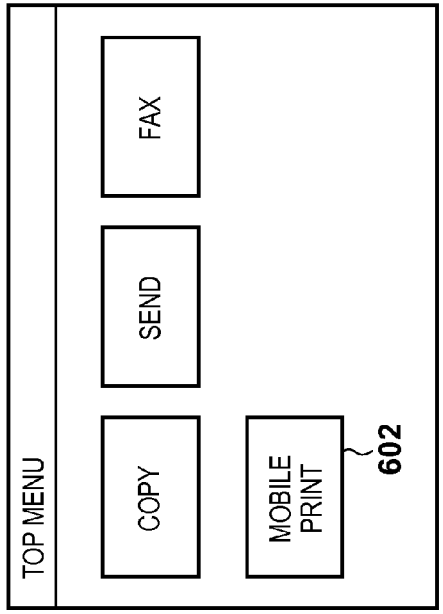
FIGS. 6A, 6B, 6C, and 6D are views showing screen examples of a notification button using a software key on an operation panel of the image forming apparatus 101.
Figure 6B:
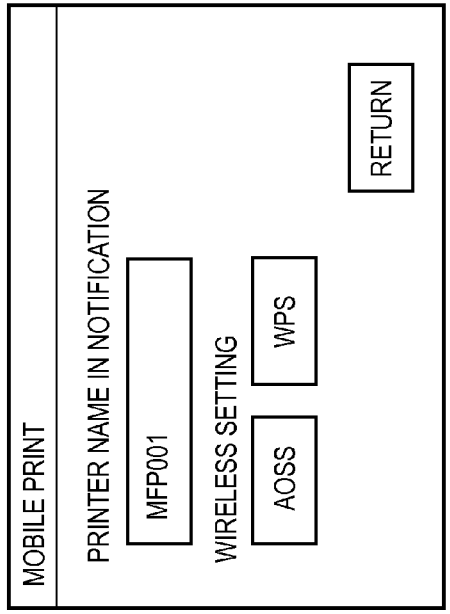
Figure 6C:
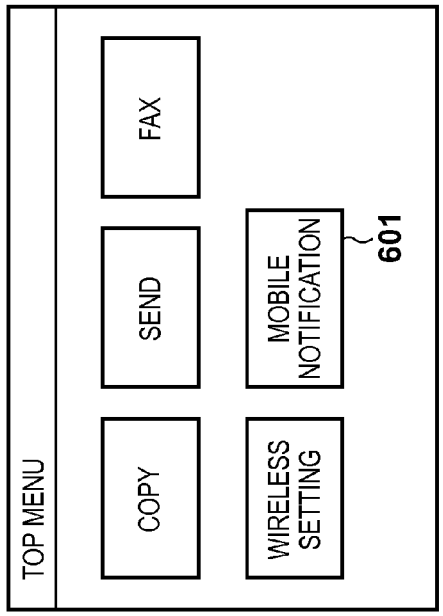

FIGS. 6A, 6B, 6C, and 6D show screen examples of a notification button using a software key on the operation panel of the image forming apparatus 101. In FIG. 6A, a button 601 is used as a notification button. When the user presses the button 601, a notification state is ON, but no screen transition occurs. FIG. 6B shows another example, and when the user presses a button 602, the current screen transits to a screen shown in FIG. 6C. In FIG. 6C, a button 603 is a notification button, and when the user presses the button 603, a notification state is ON. A field 604 describes a printer name, and allows the user to confirm a device name displayed on the mobile terminal. As another example, the button 602 in FIG. 6B is a notification button, and when the user presses the button 602, a notification state is ON. At this time, the current screen may transit to a screen shown in FIG. 6D, which displays a device name after the change, that is, the notification state is set.

FIGS. 7A and 7B show screen examples of a notification button using a hardware key on the operation panel of the image forming apparatus 101. In FIG. 7A, a button 701 is used as a notification button. In FIG. 7B, the user operates a hardware key 702 to display a notification execution menu on a display area 703, and then presses an OK button 704, thus pressing a notification button.

Note that FIGS. 6A to 6D and FIGS. 7A and 7B are premised on that the user himself or herself who is about to use the image forming apparatus or a receiving user of a print result stands in front of the image forming apparatus, and presses the software or hardware key. In addition, the following arrangement is available. That is, the image forming apparatus includes a Web server, and the user establishes a connection from a Web browser on the mobile terminal to the image forming apparatus, and presses a notification button.

Figure 6D:
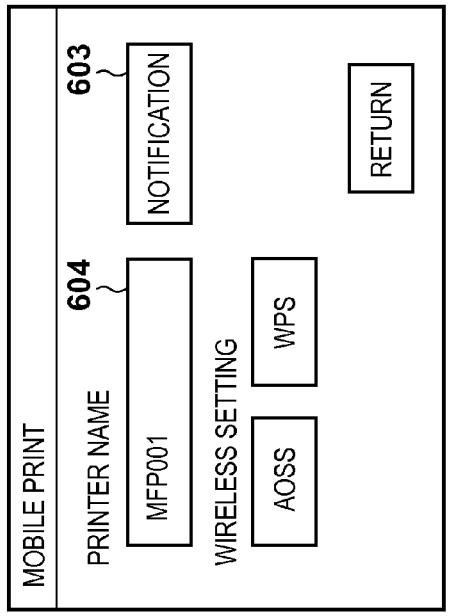

As shown in FIG. 6C or 6D or FIG. 7B, a printer name which is the same as that displayed on the terminal in response to pressing of the mobile notification button (or mobile print button) is displayed, thus allowing the user to easily identify the image forming apparatus. Especially, by displaying a visually characteristic printer name, identification is further facilitated.

<Print Processing Sequence>

Figure 8:
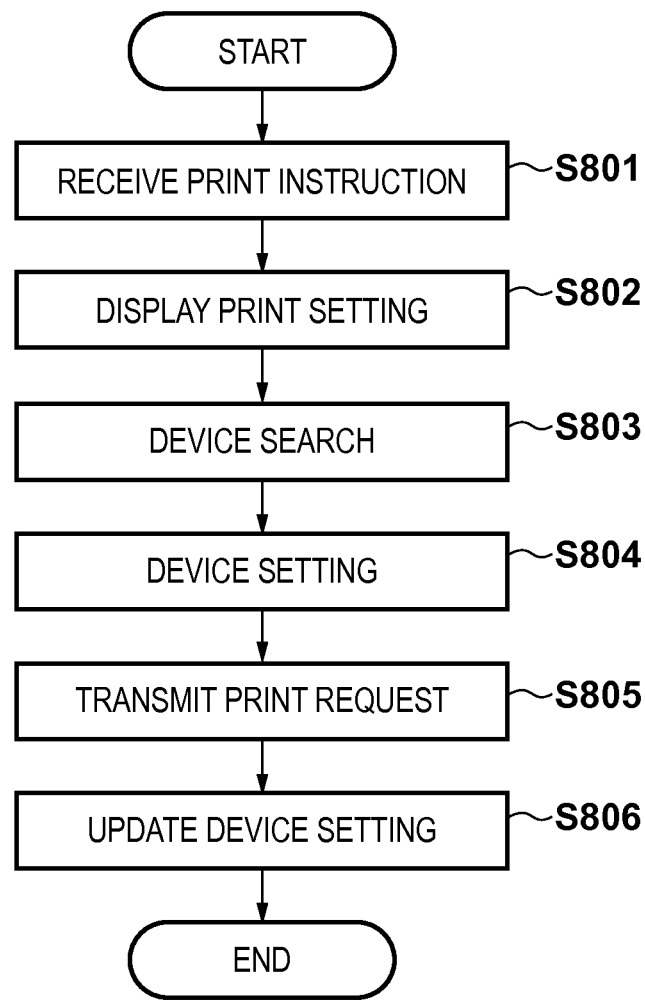
FIG. 8 is a flowchart showing processing executed when a print instruction is issued from the mobile terminal 110.

FIG. 8 is a flowchart showing processing when a print instruction is issued from the mobile terminal 110. A program of the mobile terminal 110 related to this sequence is stored in the HDD 312 or SSD 313, is read out onto the RAM 303, and is executed by the CPU 301.

When the user inputs a print instruction, the print request unit 503 receives the print instruction in step S801. The print instruction is input, for example, when the user presses a print button displayed on a user interface screen of the mobile terminal. In step S802, the print request unit 503 displays a print setting screen shown in FIG. 9. When the user presses a search button 901 on this screen, the search processing unit 501 executes device search processing to acquire device information from each of found devices, and saves the acquired information as a search result list in step S803. The search result display unit 502 displays a list of device based on the search results, that is, the device information acquired by the search. Step S803 will be described in more detail later. When the user selects a desired device from the search results, the print request unit 503 sets the selected device as a transmission destination of a print request, and displays it on a selected device field 902 in step S804. After that, when the user presses a print button 903, the print request unit 503 transmits a print request including print data to the set image forming apparatus in step S805. Next, the device setting management unit 504 updates a device setting list 1000 shown in FIG. 10 based on the device information of the selected image forming apparatus in step S806, thus ending the processing.

Figure 9:
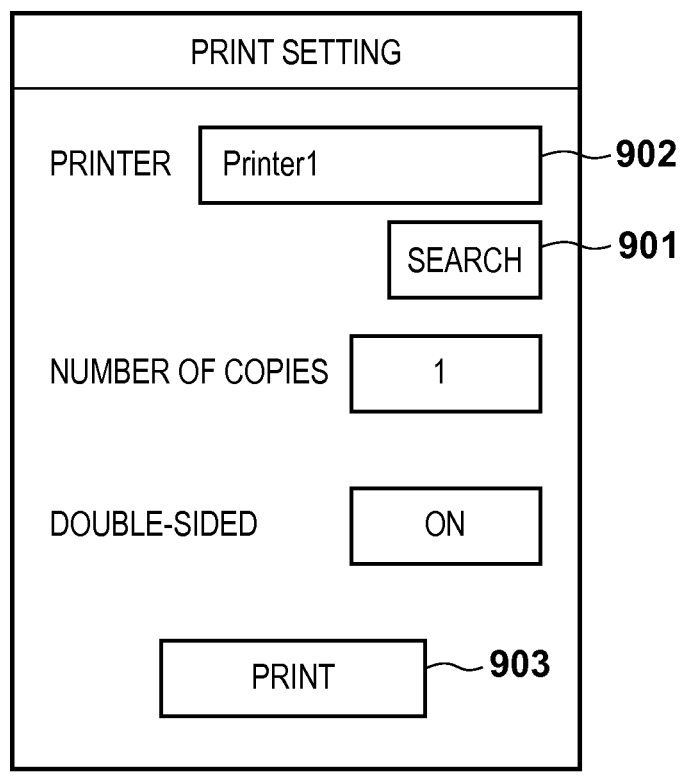
FIG. 9 is a view showing an example of a print setting screen displayed on the mobile terminal.

FIG. 9 shows an example of the print setting screen displayed on the mobile terminal. The button 901 is a search button, and when the user presses this button, a device search is conducted. The field 902 displays a name of an image forming apparatus used to execute print processing. The button 903 is a print button, and when the user presses this button, a print request is transmitted to the image forming apparatus set in the field 902.

FIG. 10 shows an example of the device setting list managed by the device setting management unit 504. The device setting list 1000 holds device information. A device identifier 1001 is an identifier used to uniquely identify a device, and holds a value included in search response data (to be described later). A device name 1002 is a name of a device. A use count 1003 holds an accumulated use count of that device. A last use time 1004 holds a last use time of that device. A favorite 1005 indicates whether or not that device is set as "favorite". Note that the device identifier 1001 and device name 1002 hold values included in device information acquired from a device. Other items hold information to be solely generated or managed by the terminal.

Note that the device information set as "favorite" in this device setting list 1000 is held in the nonvolatile memory 314, but other pieces of device information may be held on the RAM 303. When the pieces of device information are held on the RAM 303, they may be held only for a predetermined time period or until a wireless connection is disconnected.

<Device Search Processing Sequence>

FIG. 11 is a flowchart of device search processing of the mobile terminal 110. A program of the mobile terminal 110 related to this sequence is stored in the HDD 312 or SSD 313, is read out onto the RAM 303, and is executed by the CPU 301.

Figure 15A:
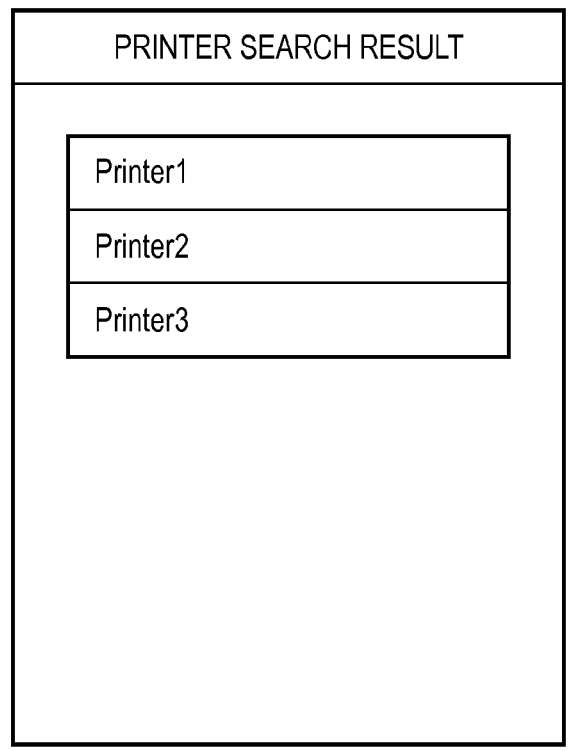
FIGS. 15A and 15B are views showing display examples of search results displayed on the mobile terminal.
Figure 15B:
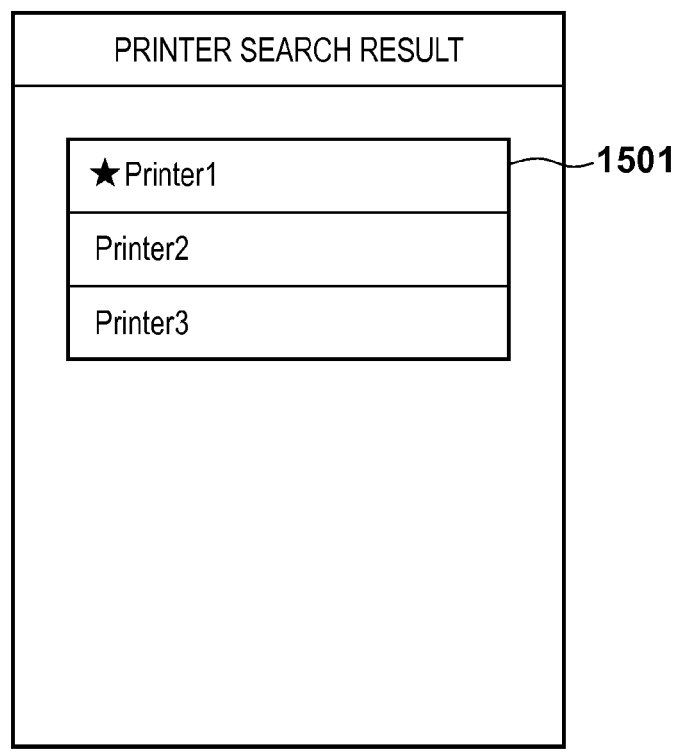

In step S1101, the search processing unit 501 multicasts a search request shown in FIG. 12 onto the network 130. A multicast destination address is that assigned to the image forming apparatuses. Next, the search processing unit 501 determines in step S1102 whether or not a predetermined time period has elapsed. If the search processing unit 501 determines in step S1102 that the predetermined time period has not elapsed yet, the process advances to step S1103. The search processing unit 501 determines in step S1103 whether or not a search response is received. The search response is as shown in FIG. 13A. If the search processing unit 501 does not receive any search response in step S1103, the process returns to step S1102. If the search processing unit 501 receives a search response in step S1103, the process advances to step S1104. In step S1104, the search processing unit 501 holds device information included in the received search response as a search result list shown in FIG. 14 in the RAM 303, and the process returns to step S1102. If the search processing unit 501 determines in step S1102 that the predetermined time period has elapsed, the process advances to step S1105. In step S1105, the search result display unit 502 displays a list of devices based on the search results in the search result list held on the RAM 303, as shown in FIGS. 15A and 15B, thus ending the processing. Note that the sequence shown in FIG. 11 is presented for the descriptive purpose. That is, a timer set with a predetermined time period may be started after transmission of a search request to wait for reception of a search response or expiration of the timer, and step S1104 or 1105 may be executed in response to either interrupt.

FIG. 12 shows an example of the search request to be transmitted by the mobile terminal. In this example, this request requests that devices having a domain name "_ipp._tcp.local" return responses. This domain name is, for example, that of the network to which the mobile terminal as the search request source is currently wirelessly connected.

FIGS. 13A and 13B show example of the search response to be transmitted by the image forming apparatus. FIG. 13B indicates that the image forming apparatus has "_ipp._tcp.local" as a domain name, "Printer1" as a device name 1301, "1001" as an identifier, and "192.168.0.1" as an IP address. Note that the message format shown in FIGS. 13A and 13B follows Bonjour. However, when other protocols are used, a message format follows the protocols to be used, as a matter of course.

FIG. 14 shows an example of the search result list which is temporarily held at the search conduction timing in step S803 in FIG. 8. A search result list 1400 includes items of an identifier returned from a device, a device name, and an IP address.

FIGS. 15A and 15B show display examples of search results displayed on the mobile terminal in step S803 in FIG. 8. FIG. 15A shows a state in which three image forming apparatuses are found on the network. When the user selects one device from this list, the display screen shown in FIG. 9 is displayed, and print processing is executed in response to a print instruction.

<Search Response Processing Sequence in Image Forming Apparatus>

FIG. 16 is a flowchart showing the processing of the user input acceptance unit 402 of the image forming apparatus 101. A program of the image forming apparatus 101 related to this sequence is stored in the HDD 211, is read out onto the RAM 202, and is executed by the CPU 201.

The user input acceptance unit 402 determines in step S1601 whether or not the user presses the notification button, and waits until the user presses that button. If the user input acceptance unit 402 determines that the user presses the notification button, it starts a timer of a predetermined time period, and sets a notification state to be ON in step S1602. Next, in step S1603, the user input acceptance unit 402 waits for generation of a re-pressing event of the notification button or a timer end event. If the re-pressing event of the notification button is generated in step S1603, the user input acceptance unit 402 resets the timer of the predetermined time period and restarts it in step S1604. Then, the process returns to step S1603. If the timer end event is generated in step S1603, the process advances to step S1605. The user input acceptance unit 402 sets a notification flag to be OFF in step S1605, and the process returns to step S1601. With the above sequence, the notification state is ON for the predetermined time period after the notification button is pressed. Note that after step S1602, a device name on the screen shown in FIG. 6C displayed on the image forming apparatus at that time may be changed to that when the notification state is set to be ON, and the screen shown in FIG. 6D may be displayed. In this case, after step S1605, a device name on the screen shown in FIG. 6D displayed on the image forming apparatus at that time may be changed to that when the notification state is set to be OFF, and the screen shown in FIG. 6C may be displayed.

Note that step S1601 indicates a waiting state of an operation. When the user makes a button operation in the waiting state, the control branches to processing according to the operated button. FIG. 16 shows a branch destination when the notification button is operated. The same applies to other sequences, and a determination repetition loop does not always indicate that on the actual processing but it indicates a waiting state of generation of an interrupt event and the like.

Figure 17:
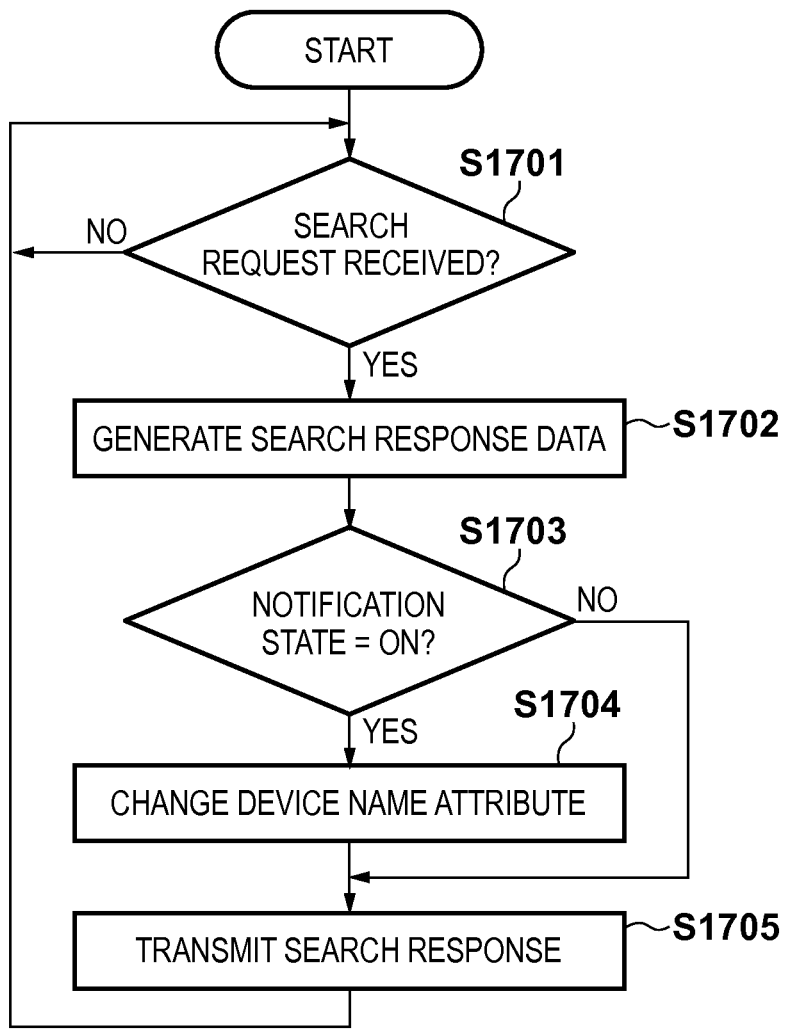
FIG. 17 is a flowchart showing processing of a search request processing unit 401.

FIG. 17 is a flowchart showing processing of the search request processing unit 401. The search request processing unit 401 determines in step S1701 whether or not a search request is received, and waits until the search request is received. If the search request is received, the search request processing unit 401 generates search response data shown in FIG. 13A in step S1702. Next, the search request processing unit 401 determines in step S1703 whether the notification state is ON or OFF. If the notification state is OFF, the process jumps to step S1705. If the notification state is ON, the search request processing unit 401 changes a device name attribute value 1301 in the response data, and appends a characteristic letter or symbol such as "★" to the head of the value in step S1704. Thus, the search response data is changed, as shown in FIG. 13B. In step S1705, the search request processing unit 401 multicasts the generated search response data onto the network 130 as a search response, and the process then returns to step S1701. However, the search request processing unit 401 may unicast a response to the mobile terminal which issued the search request.

Note that various other change methods of the device name attribute in step S1704 are available. For example, when the image forming apparatus has a user authentication function, and the user has logged in to the image forming apparatus before he or she presses the notification button, a login user name may be added to the device name attribute. Alternatively, pressing time information of the notification button may be held, and may be appended to the device name attribute.

FIG. 15B shows a display example of the search results on the mobile terminal when the device name attribute is changed in step S1704 in FIG. 17. In FIG. 15B, three image forming apparatuses are found on the network, and an image forming apparatus on which the user pressed the notification button prior to the device search is displayed to have a name with ★ like a device name 1501.

As described above, the device name of the image forming apparatus on which the user operated the notification button is modified to indicate that operation, and the modified device name is displayed in a list of devices on the user interface of the client device such as the mobile terminal. Thus, the device designated by the user becomes highly identifiable. Furthermore, since that device name is also displayed on the image forming apparatus, that apparatus is identifiable more highly. Then, the user can issue a print job to the image forming apparatus selected from that device list, and can control that apparatus to execute print processing.

[Second Embodiment]

The second embodiment will be described below. In the first embodiment, when the mobile terminal conducts a device search after an elapse of the predetermined time period since pressing of the notification button on the image forming apparatus, since the image forming apparatus has canceled the notification state, it returns an original device name. For this reason, that original device name is displayed on the mobile terminal. In this embodiment, the mobile terminal holds device identifier information and device name information of an image forming apparatus which was used at least once in print processing. Then, at a device search timing, when an identifier included in a search response matches any of held device identifiers, the corresponding device name is displayed as a search result. Thus, when the image forming apparatus used once after the notification button was pressed is to be used later, the device name displayed upon pressing of the notification button can be effectively displayed even when the notification button is not pressed. Note that in this embodiment, a description associated with the same parts as in the first embodiment will not be repeated, and only differences will be explained.

Figure 18:
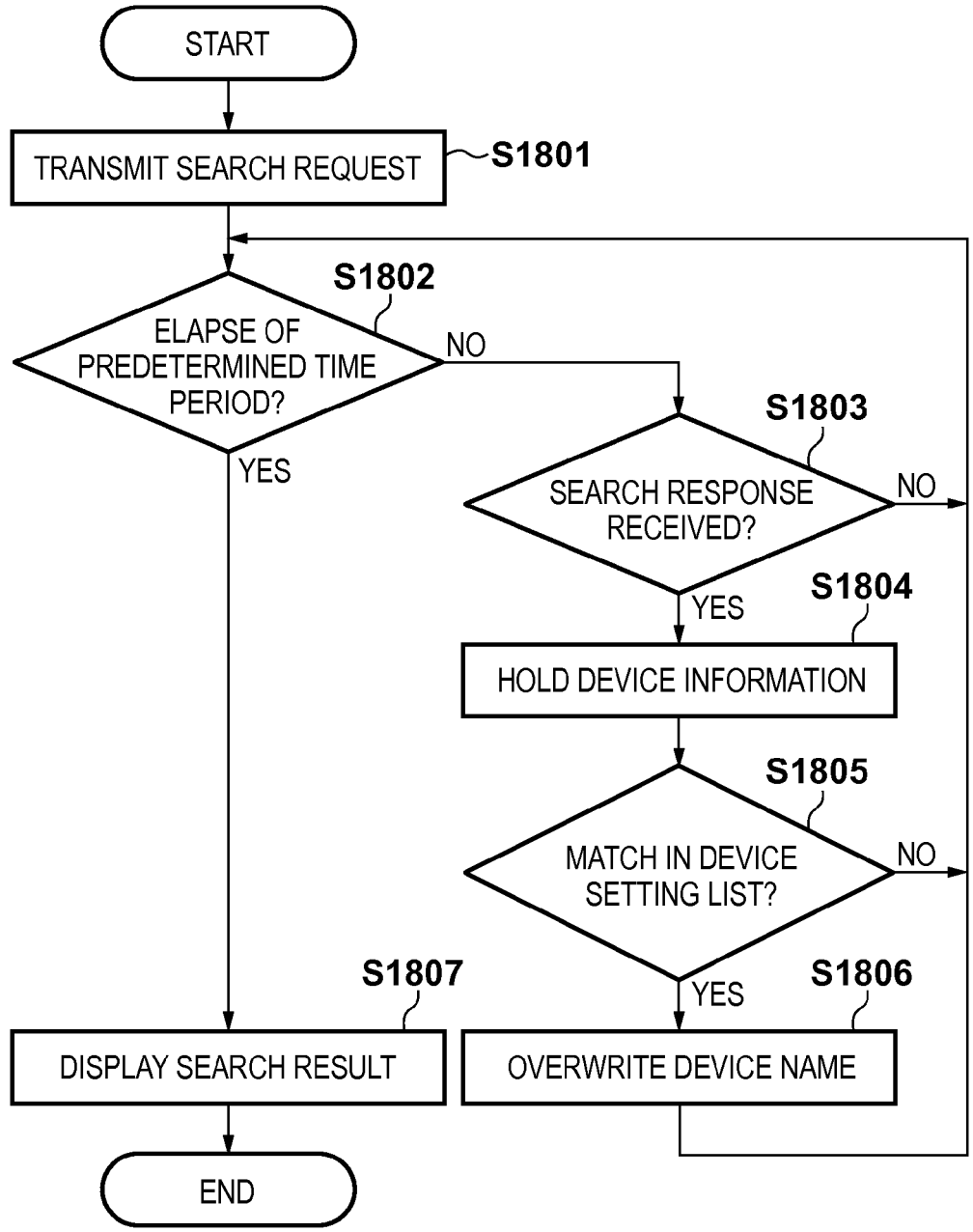
FIG. 18 is a flowchart showing device search processing of the mobile terminal 110.

FIG. 18 is a flowchart showing device search processing of a mobile terminal 110. A program of the mobile terminal 110 related to this sequence is stored in an HDD 312 or SSD 313, is read out onto a RAM 303, and is executed by a CPU 301.

In step S1801, a search processing unit 501 multicasts a search request shown in FIG. 12 onto a network 130. The search processing unit 501 determines in step S1802 whether or not a predetermined time period has elapsed. If the search processing unit 501 determines in step S1802 that the predetermined time period has not elapsed yet, the process advances to step S1803. The search processing unit 501 determines in step S1803 whether or not a search response is received. The search response is as shown in FIG. 13A or 13B depending on whether or not a notification button is pressed. If the search processing unit 501 does not receive any search response in step S1803, the process returns to step S1802. If the search processing unit 501 receives the search response in step S1803, the process advances to step S1804. In step S1804, the search processing unit 501 holds device information included in the received search response in the RAM 303 as a search result list shown in FIG. 14. The search processing unit 501 determines in step S1805 whether or not a device identifier included in the received search response matches any of those in a held device setting list 1000. If the device identifier does not match, the process returns to step S1802. If the device identifier matches, the search processing unit 501 acquires the corresponding device name information from the device setting list 1000, and overwrites the device name in the search result list by that device name in step S1806. Then, the process returns to step S1802. If the search processing unit 501 determines in step S1802 that the predetermined time period has elapsed, the process advances to step S1807. In step S1807, a search result display unit 502 displays search results shown in FIG. 15A or 15B based on the search result list held in the RAM 303, thus ending the processing.

With the aforementioned sequence, when there is a record indicating that an image forming apparatus which returned a response to a device search request was used in print processing, the previously used device name is displayed on the user interface of the mobile terminal as that of the corresponding image forming apparatus. For this reason, for example, in an environment in which a specific user uses a specific image forming apparatus, when that user initially uses the specific image forming apparatus while its notification button is pressed, he or she can easily identify the specific image forming apparatus on the device list of the mobile terminal.

[Third Embodiment]

The third embodiment will be described below. In the first embodiment, a device name attribute value to be returned as a search response is changed on the image forming apparatus side, thereby changing a search result to be displayed on the mobile terminal. In this embodiment, a device search protocol is expanded to add a new attribute related to pressing of a notification button, and when the notification button is pressed, the image forming apparatus changes that attribute and returns the changed attribute as a search response. The mobile terminal side analyzes the returned search response to change a search result to be displayed. In this way, the mobile terminal side modifies informant included in the search response to effectively make various displays that can be easily understood by the user. Note that in this embodiment, a description associated with the same parts as in the first embodiment will not be repeated, and only differences will be explained.

FIG. 19 shows an example of search response data to be transmitted by an image processing apparatus. An attribute 1901 is a notification attribute indicating whether or not the notification button is pressed. An attribute 1902 indicates a pressing time of the notification button. An attribute 1903 indicates a user name who pressed the notification button. An attribute 1904 indicates an accumulated count of pressing of the notification button by the user identified by the attribute 1903. An attribute 1905 indicates a total count of pressing of the notification button in the image forming apparatus. Note that the attributes 1902, 1903, and 1904 have no value when the attribute 1901 is false.

Figure 20:
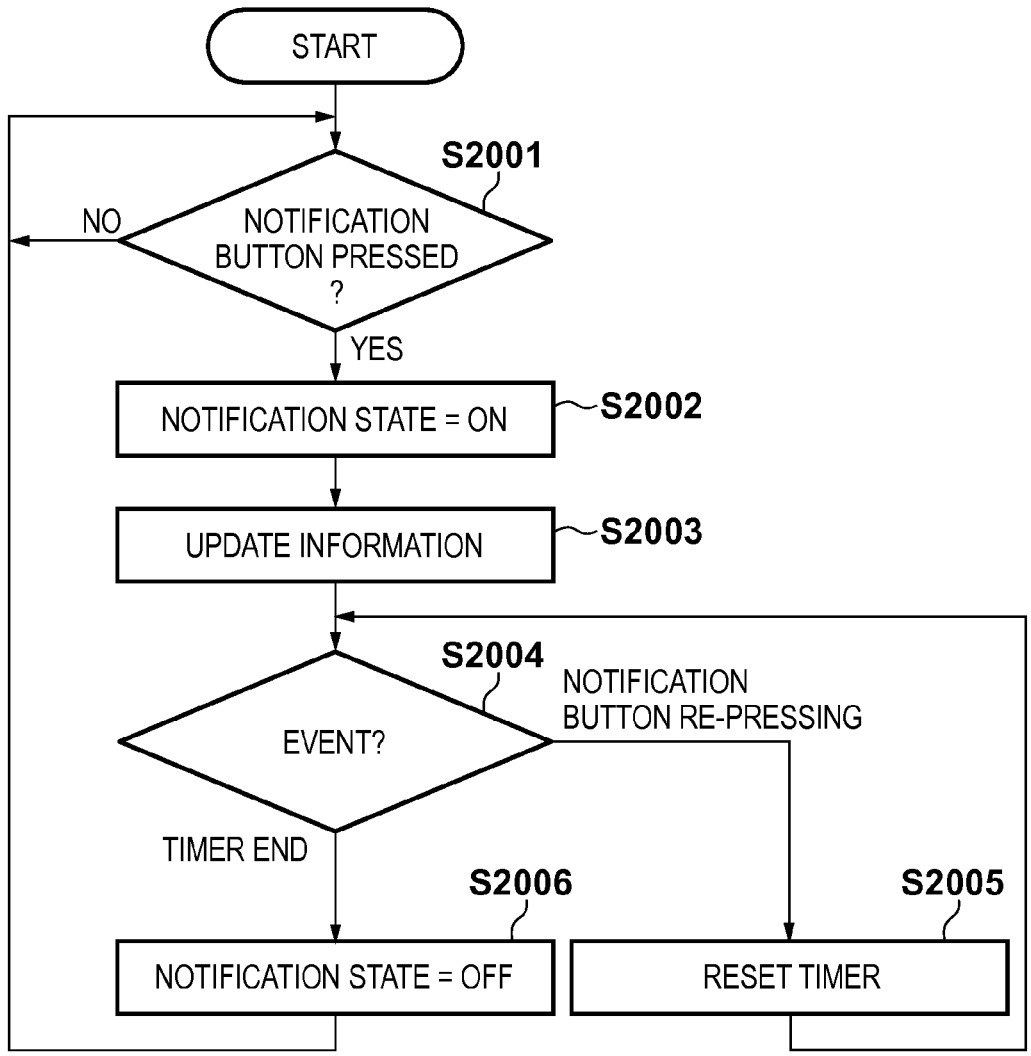
FIG. 20 is a flowchart showing processing of the user input acceptance unit 402.

FIG. 20 is a flowchart showing processing of a user input acceptance unit 402 of an image forming apparatus 101. A program of the image forming apparatus 101 related to this sequence is stored in an HDD 211, is read out onto a RAM 202, and is executed by a CPU 201. The flowchart shown in FIG. 20 is the same as that shown in FIG. 16 in the first embodiment, except that processing of step S2003 is added. Steps S2001 and S2002 are the same as steps S1601 and S1602 of FIG. 16, and a description thereof will not be repeated. In step S2003, the user input acceptance unit 402 holds a notification button pressing time and user name who pressed the notification button in a RAM 303. Furthermore, the user input acceptance unit 402 increments a notification pressing accumulated count for each user and that for the overall image forming apparatus by "1", and holds them in a nonvolatile memory 209. Since steps S2004 to S2006 are the same as steps S1603 to S1605 of FIG. 16, a description thereof will not be repeated.

Figure 21:
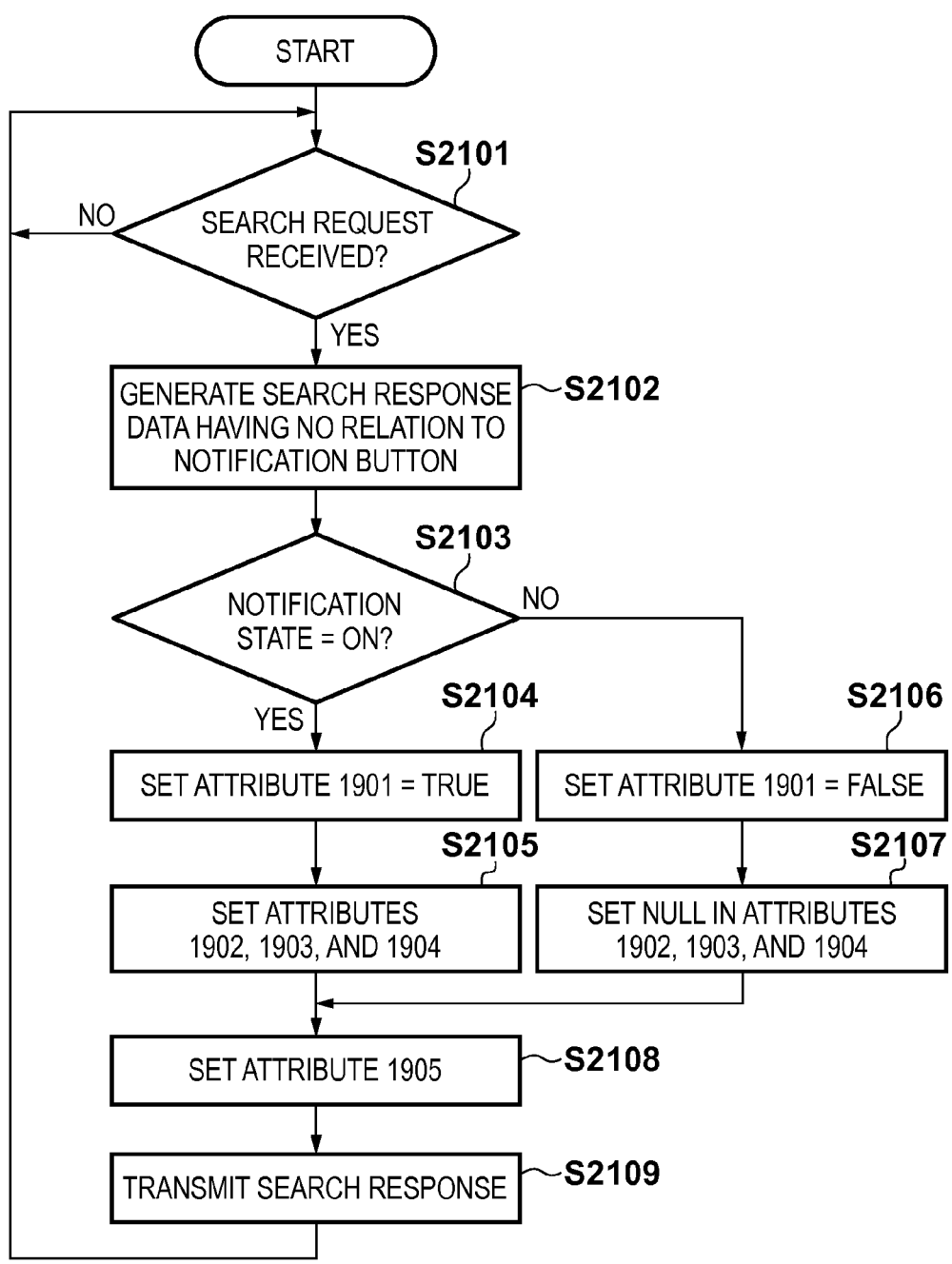
FIG. 21 is a flowchart showing processing of the search request processing unit 401.

FIG. 21 is a flowchart showing processing of a search request processing unit 401 of the image forming apparatus. A program of the image forming apparatus 101 related to this sequence is stored in the HDD 211, is read out onto the RAM 202, and is executed by the CPU 201.

The search request processing unit 401 determines in step S2101 whether or not a search request is received, and waits until a search request is received. If the search request is received, the search request processing unit 401 generates search response data which is not related to the notification button, as shown in FIG. 13A, in step S2102. Next, the search request processing unit 401 determines in step S2103 whether or not a notification state is ON. If YES is determined in step S2103, the search request processing unit 401 sets "true" in the attribute 1901 of the search response data in step S2104. In step S2105, the search request processing unit 401 sets the attributes 1902, 1903, and 1904 of the search response data based on the information held in step S2003 of FIG. 20. If NO is determined in step S2103, the search request processing unit 401 sets "false" in the attribute 1901 of the search response data in step S2106. Next, in step S2107, the search request processing unit 401 sets "NULL" in all the attributes 1902, 1903, and 1904 of the search response data. In step S2108, the search request processing unit 401 sets the attribute 1905 of the search response data based on the information held in step S2003 of FIG. 20. Next, in step S2109, the search request processing unit 401 multicasts the generated search response data onto the network 130, and the process then returns to step S2101.

Figure 22:
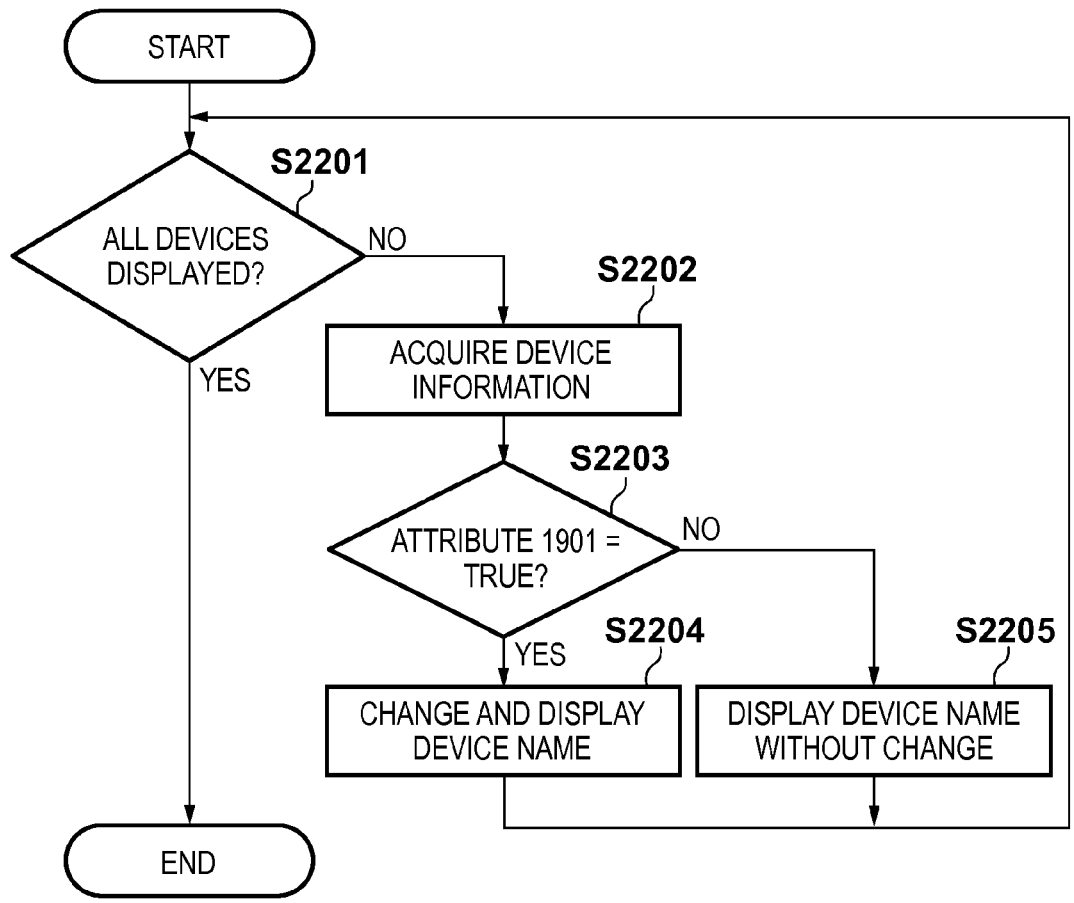
FIG. 22 is a flowchart showing processing of a search result display unit 502.

FIG. 22 is a flowchart showing processing of a search result display unit 502 of the mobile terminal. The flowchart shown in FIG. 22 corresponds to step S1105 of FIG. 11 in the first embodiment.

The search result display unit 502 determines in step S2201 whether or not all search results in a search result list 1400 held in a RAM 303 are displayed. If all search results are already displayed, the processing ends. If devices to be displayed still remain, the search result display unit 502 acquires device information of an image forming apparatus of interest from the search result list 1400 in step S2202. Next, the search result display unit 502 determines in step S2203 whether or not the attribute 1901 is true. If the attribute 1901 is true, the search result display unit 502 displays a device name of the image forming apparatus of interest while appending a characteristic letter or symbol like, for example, "★" to the head of the device name in step S2204. Furthermore, the search result display unit 502 may display additional information according to the attributes 1902, 1903, and 1904. The process then returns to step S2201. If the attribute 1901 is false, the search result display unit 502 displays a device name intact in step S2205, and the process returns to step S2201. Note that it may be configured to allow the user of the mobile terminal to set a letter or symbol to be appended to the device name.

Figure 23:
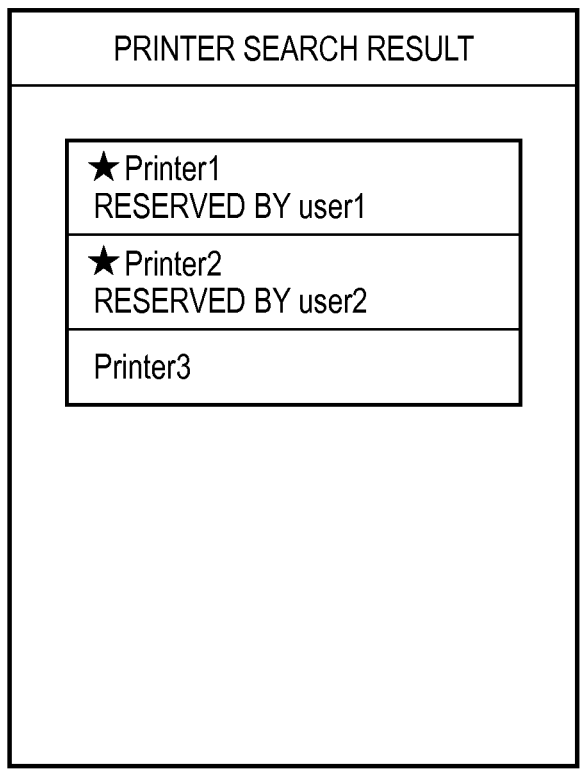
FIG. 23 is a view showing a display example of search results displayed on the mobile terminal.

FIG. 23 shows a display example of search results displayed on the mobile terminal. In this example, three image forming apparatuses are found on the network. Since the user pressed the notification button on an image forming apparatus having a device name "Printer1" and on an image forming apparatus having a device name "Printer2", these device names are displayed while being appended with ★. Also, user names who pressed the notification buttons are also displayed as additional information according to the values of the attribute 1903.

As described above, according to this embodiment, the device name of the image forming apparatus, the notification button of which is operated by the user is modified to indicate that operation, and is displayed on the user interface of the client terminal such as the mobile terminal. Also, since this modification is applied on the mobile terminal side, a device designated by the user is highly identifiable.

[Fourth Embodiment]

The fourth embodiment will be described below. In this embodiment, upon displaying search results on a mobile terminal, a priority is decided based on whether or not a notification button is pressed on an image forming apparatus and whether or not an image forming apparatus was previously used, and display is changed according to the priority. Thus, the user can identify a desired image forming apparatus more easily. Note that in this embodiment, a description associated with the same parts as in the first, second, and third embodiments will not be repeated, and only differences will be explained.

In this embodiment, if a favorite device is found, that device is set to have a top priority, and priority levels are classified from 1 to 4 by processing to be described below.

Figure 24:
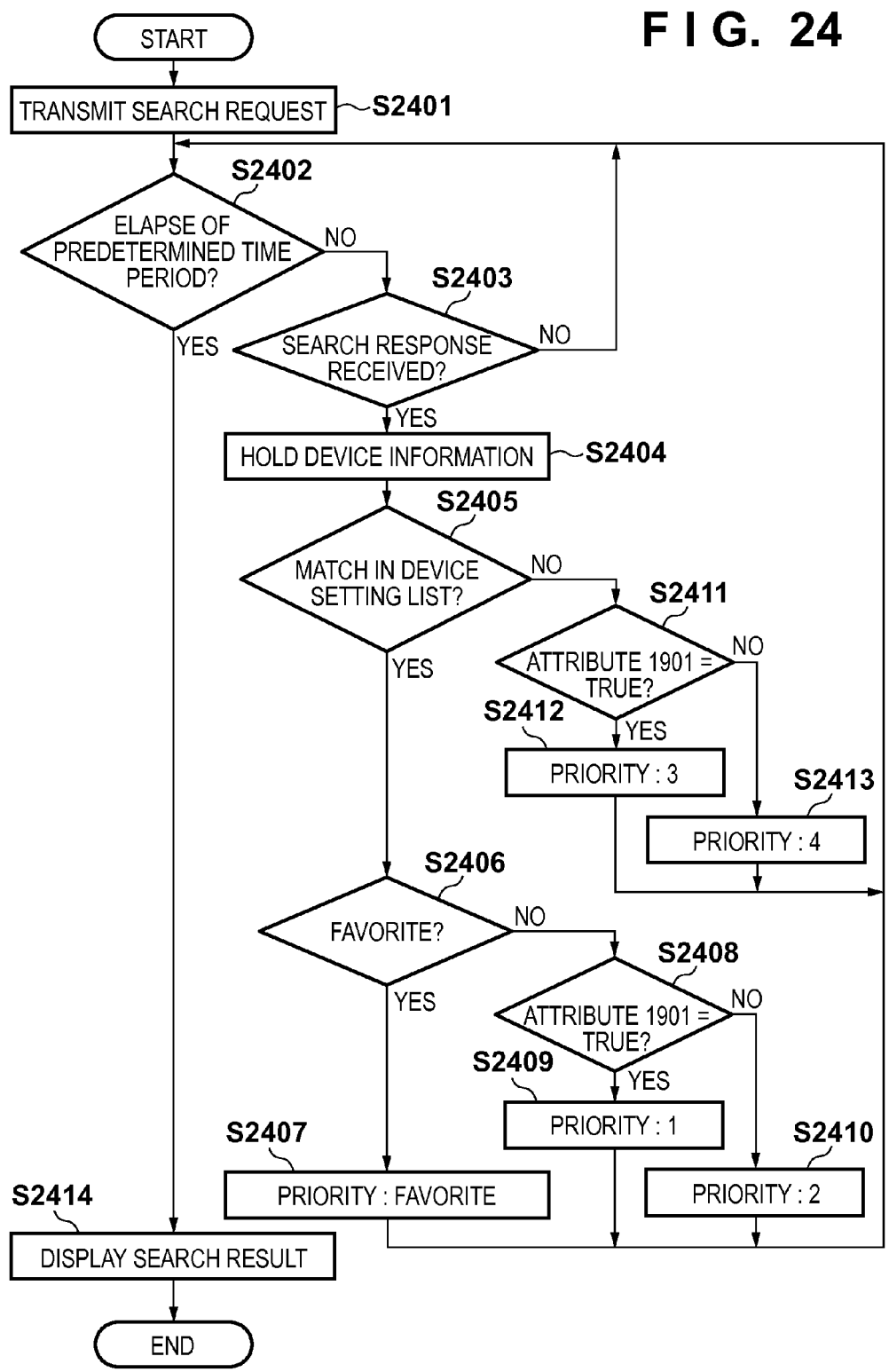
FIG. 24 is a flowchart showing device search processing and priority decision processing.

FIG. 24 is a flowchart showing device search processing and priority decision processing of a mobile terminal 110.

A program of the mobile terminal 110 related to this sequence is stored in an HDD 312 or SSD 313, is read out onto a RAM 303, and is executed by a CPU 301.

The flowchart shown in FIG. 24 is the same as that shown in FIG. 18 in the third embodiment, except that processes of step S2405 and subsequent steps are added. Steps S2401 to S2404 are the same as steps S1801 to S1804 of FIG. 18, and a description thereof will not be repeated.

A search processing unit 501 determines in step S2405 whether or not a device identifier included in a received search response matches any of those included in a held device setting list 1000. If the device identifier matches, the process advances to step S2406. The search processing unit 501 determines in step S2406 whether or not the device identifier included in the received search response matches that of a device set as "favorite". If the device identifier matches, the search processing unit 501 sets a priority of this device to be "favorite" in step S2407, and the process returns to step S2402. Note that this "favorite" setting is initially designated by the user in advance. Also, the "favorite" setting can also be canceled by the user. If the device identifier does not match, the search processing unit 501 determines in step S2408 whether or not the notification button is pressed by checking if an attribute 1901 is true. If the attribute 1901 is true, the search processing unit 501 sets a priority of this device to be "1" in step S2409, and the process returns to step S2402. If the attribute 1901 is false, the search processing unit 501 sets a priority of this device to be "2" in step S2410, and the process returns to step S2402. If the device identifier does not match as a result of determination in step S2405, the search processing unit 501 determines in step S2411 whether or not the notification button is pressed by checking if the attribute 1901 is true. If the attribute 1901 is true, the search processing unit 501 sets a priority of this device to be "3" in step S2412, and the process returns to step S2402. If the attribute 1901 is false, the search processing unit 501 sets a priority of this device to be "4" in step S2413, and the process returns to step S2402. If the search processing unit 501 determines in step S2402 that a predetermined time period has elapsed, the process advances to step S2414. In step S2414, a search result display unit 502 displays search results shown in FIGS. 25A to 25E according to the priority levels of the search result list held in the RAM 303, thus ending the processing. Note that in this flowchart, the highest priority is "favorite", the second highest priority is "1", and the priority levels are lower in descending order of priority value. Note that the priority levels "2" and "3" may be reversed. In this case, a priority is set to be "3" in step S2410, and it is set to be "2" in step S2412. The priority levels set in the sequence shown in FIG. 24 are stored in the device setting list in association with device identifiers of image forming apparatuses.

FIGS. 25A to 25E show display examples of search results to be displayed on the mobile terminal. FIG. 25A shows a change example of device names to be displayed in correspondence with five different priority levels "favorite" and "1" to "4". FIGS. 25B to 25E show variation examples of device display methods of a top priority device when devices with high and low priority levels are found. In FIG. 25B, an icon of the top priority device is displayed, or icons of all devices are displayed, and that of the top priority device is displayed to have an enlarged size. In FIG. 25C, a background color of the top priority device is changed. In FIG. 25D, a display area of the top priority device is broadened. In FIG. 25E, a use count of the top priority device is indicated by the number of stars.

As described above, priority levels can be given to devices based on device use records, pressing of a notification button (that is, a priority designated by the user), and the like, and can be visually displayed in the device list. Thus, a device with a high priority level is highly identifiable according to the use record of the user and the like.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-174367, filed Aug. 6, 2012, which is hereby incorporated by reference herein in its entirety.

What is claimed is:

1. A device search system in which an information processing apparatus connected to a communication network searches for an image forming apparatus, wherein
the image forming apparatus comprises:
a holding unit configured to hold, when a notification input from a user is received, a notification state indicating the reception of the notification input for a predetermined time period since the reception of the notification input, wherein the notification state is set in response to a depression of a notification button for the notification input; and
a search request processing unit configured to transmit, in response to reception of a search request from the information processing apparatus, a search response including an identifier of the image forming apparatus and a name of the image forming apparatus, wherein the name is changed depending on whether or not the notification state is set, and
wherein the information processing apparatus comprises a display unit configured to display, when a search response to a search request transmitted to the image forming apparatus is received, a name of an image forming apparatus in a list of image forming apparatuses as a search result based on a name of the image forming apparatus included in the search response,
wherein the name of the image forming apparatus displayed by the display unit has been changed according to whether or not the notification state is set.

2. The system according to claim 1, wherein the search request processing unit puts a set name in the search response when the notification state is not set, and puts a name obtained by modifying the set name in the search response when the notification state is set.

3. The system according to claim 1, wherein the image forming apparatus further comprises a display unit configured to display the same name as the name of the image forming apparatus included in a search result to be transmitted by the search request processing unit.

4. The system according to claim 1, wherein the information processing apparatus further comprises a storage unit configured to store device information including a name and an identifier included in the search response, and
when an identifier included in a received search response is included in the device information stored by the storage unit, the search result display unit displays the name stored in the storage unit in association with the identifier in place of a name included in the search response.

5. An image forming apparatus in a device search system in which an information processing apparatus connected to a communication network searches for image forming apparatuses, and displays a list of responding image forming apparatuses, the apparatus comprising:
a holding unit configured to hold, when a notification input from a user is received, a notification state indicating the reception of the notification input for a predetermined time period since the reception of the notification input, wherein the notification state is set in response to a depression of a notification button for the notification input; and a search request processing unit configured to transmit, in response to reception of a search request from the information processing apparatus, a search response including an identifier of the image forming apparatus and a name of the image forming apparatus, wherein the name is changed depending on whether or not the notification state is set, wherein the information processing apparatus displays a name of the image forming apparatus in the list of image forming apparatuses according to the response from the image forming apparatus, and wherein the name of the image forming apparatus displayed by the information processing apparatus is changed according to whether or not the notification state is set.

6. The apparatus according to claim 5, further comprising a display unit, which displays the same name as the name of the image forming apparatus included in a search result to be transmitted by the search request processing unit.

7. A non-transitory computer-readable medium storing a program for causing a computer to function as an image forming apparatus according to claim 5.

8. An information processing apparatus in a device search system in which an information processing apparatus connected to a communication network searches for an image forming apparatus that holds, when a notification input from a user is received, a notification state indicating the reception of the notification input for a predetermined time period since the reception of the notification input, the apparatus comprising:

a transmission unit configured to transmit a search request to the image forming apparatus; and a display unit configured to display, when a search response is received from the image forming apparatus, a name of the image forming apparatus in a list of image forming apparatus based on a name of the image forming apparatus included in the search response, wherein the image forming apparatus transmits, in response to the search request, the search response including an identifier of the image forming apparatus and a name of the image forming apparatus, wherein the name is changed depending on whether or not the notification state is set, and wherein the name of the image forming apparatus displayed by the display unit has been changed according to whether or not the notification state is set.

9. The apparatus according to claim 8, further comprising a storage unit configured to store device information including a name and an identifier included in the search response, wherein when an identifier included in a received search response is included in the device information stored by the storage unit, the display unit displays the name stored in the storage unit in association with the identifier in place of a name included in the search response.

10. A non-transitory computer-readable medium recording a program for controlling a computer to function as an information processing apparatus according to claim 8.

11. A method of searching a device in device search system in which an information processing apparatus connected to a communication network searches for an image forming apparatus, the method comprising:

holding by the image forming apparatus a notification state indicating the reception of the notification input for a predetermined time period since the reception of the notification input when the image forming apparatus receives a notification input from a user, wherein the notification state is set in response to a depression of a notification button for the notification input;

transmitting, by the image forming apparatus, in response to reception of a search request from the information processing apparatus, a search response including an identifier of the image forming apparatus and a name of the image forming apparatus, wherein the name is changed depending on whether or not the notification state is set, and displaying by the information processing apparatus a name of an image forming apparatus in a list of image forming apparatuses as a search result based on a name of the image forming apparatus included in the search response when the information processing apparatus receives a search response to a search request transmitted to the image forming apparatus, wherein the name of the image forming apparatus displayed by the information processing apparatus is changed according to whether or not the notification state is set.

* * * * *